ature Digital Data

United States Patent [19]
Lewis

[11] Patent Number: 4,489,392
[45] Date of Patent: Dec. 18, 1984

[54] ORTHOGONALIZER FOR INPHASE AND QUADRATURE DIGITAL DATA

[76] Inventor: Bernard L. Lewis, 13318 Fort Washington Rd., Oxon Hill, Md. 20022

[21] Appl. No.: 386,828

[22] Filed: Jun. 9, 1982

[51] Int. Cl.³ .............................................. G01S 9/42
[52] U.S. Cl. .................................... 364/724; 343/7.7; 343/381
[58] Field of Search ................. 364/724; 343/7.7, 375, 343/381, 5 DP

[56] References Cited
U.S. PATENT DOCUMENTS 4,119,962 10/1978 Lewis .................................... 343/7.7
4,122,448 10/1978 Martin .................................. 343/7.7
4,217,584 8/1980 Lombardi et al. ................... 343/7.7

Primary Examiner—David H. Malzahn
Attorney, Agent, or Firm—Robert F. Beers; William T. Ellis; Alan P. Klein

[57] ABSTRACT

An orthogonalizer wherein a series of complex digital numbers is received, each number having correlated (non-orthogonal) real and imaginary parts; a weight is established which is a measure of the correlation; the product is formed of one of the parts of one of the received complex numbers with the weight; and the product is subtracted from the other part of the one received complex number to decorrelate (orthogonalize) the real and imaginary parts thereof.

6 Claims, 2 Drawing Figures

ORTHOGONALIZER FOR INPHASE AND QUADRATURE DIGITAL DATA

BACKGROUND OF THE INVENTION

This invention relates generally to radar systems and more particularly to methods and apparatus for correcting phase imbalances between inphase and quadrature channels of digital signal processing systems.

Inphase and quadrature phase non-orthogonality (where by the term "non-orthogonality" is meant correlation) has been a problem in digital signal processors such as adaptive moving target indicators (MTI) and coherent sidelobe cancellers. Adaptive interference cancelers are limited in the amount of interference they can cancel by the non-orthogonality of the inphase and quadrature data.

SUMMARY OF THE INVENTION

An object of the invention is to orthogonalize the digital inphase and quadrature data supplied from analog-to-digital converters at the output of the inphase and quadrature channel detectors.

Another object is to permit digital signal processors to operate optimally by orthogonalizing digital inphase and quadrature data supplied thereto.

These and other objects of the invention are achieved by an orthogonalizer which includes means to receive a series of complex digital numbers having correlated real and imaginary parts, means to establish a weight which is a measure of the correlation, a multiplier to form the product of one of the parts of a received complex digital number with the weight, and a subtractor to subtract the product from the other part of the received complex digital number to decorrelate the real and imaginary parts of the number.

An advantage of the orthogonalizer is its adaptive capability; it compensates for any changes with time in the decorrelation of the real and imaginary parts of the series of complex digital numbers.

Additional advantages and features will become apparent as the subject invention becomes better understood by reference to the following detailed description when considered in conjunction with the accompanying drawings, wherein:

DESCRIPTION OF THE PREFERRED EMBODIMENT

Figure 1:
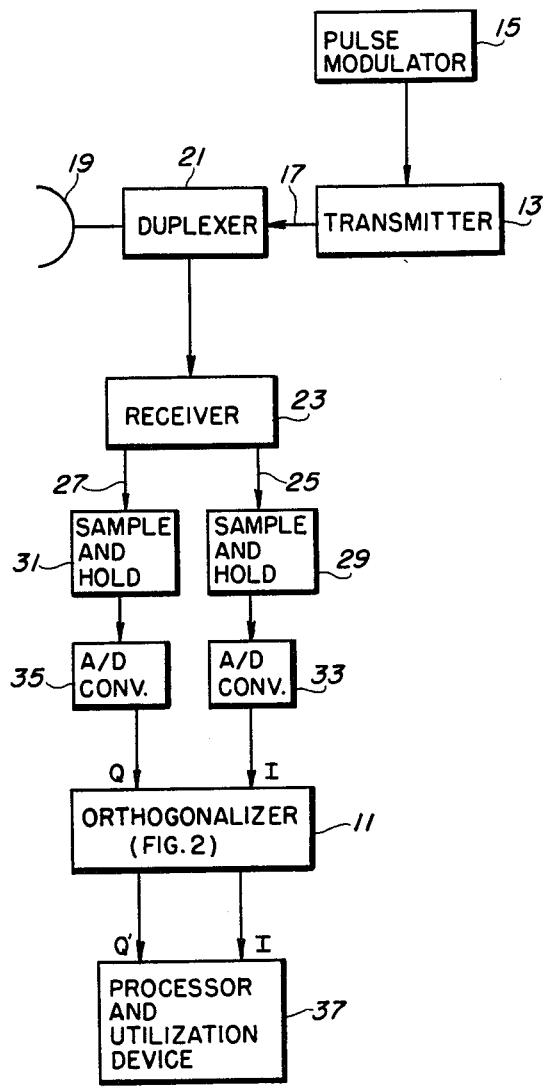
FIG. 1 is a block diagram of an MTI radar incorporating the orthogonalizer of the present invention.

FIG. 1 is a block diagram of a conventional moving-target-indicator (MTI) radar (as shown, for example, in FIGS. 4.5 and 4.21 of Skolnik, *Introduction to Radar Systems*, 2d Ed.) with the addition of an orthogonalizer 11 comprising the improvement. A transmitter 13 is pulsed by a modulator 15 to generate a repetitive train of pulses on a carrier. The waveform generated by the transmitter 13 travels via a transmission line 17 to an antenna 19 where it is radiated into space to illuminate a target. The antenna 19 is used for both transmitting and receiving. A duplexer 21 channels the radar echos received by the antenna 19 to a receiver 23 whose outputs 25 and 27 are respectively inphase and quadrature component baseband signals representing the magnitude and relative phase of the echo received by the antenna. The receiver outputs 25 and 27 are sampled in sample-and-hold circuits 29 and 31, and converted in analog-to-digital converters 33 and 35 to digital numbers I and Q representing respectively the real and imaginary parts of a complex digital number. If there are phase-imbalances between the inphase and quadrature channels of the receiver 23, the real and imaginary parts of the complex digital number may not be perfectly orthogonal. By "orthogonal" is meant decorrelated. The orthogonalizer 11 corrects for phase imbalances in the receiver 23 and produces a dual input to the processor and utilization device 37 which comprises a complete digital number having uncorrelated real and imaginary parts I and Q'.

Figure 2:
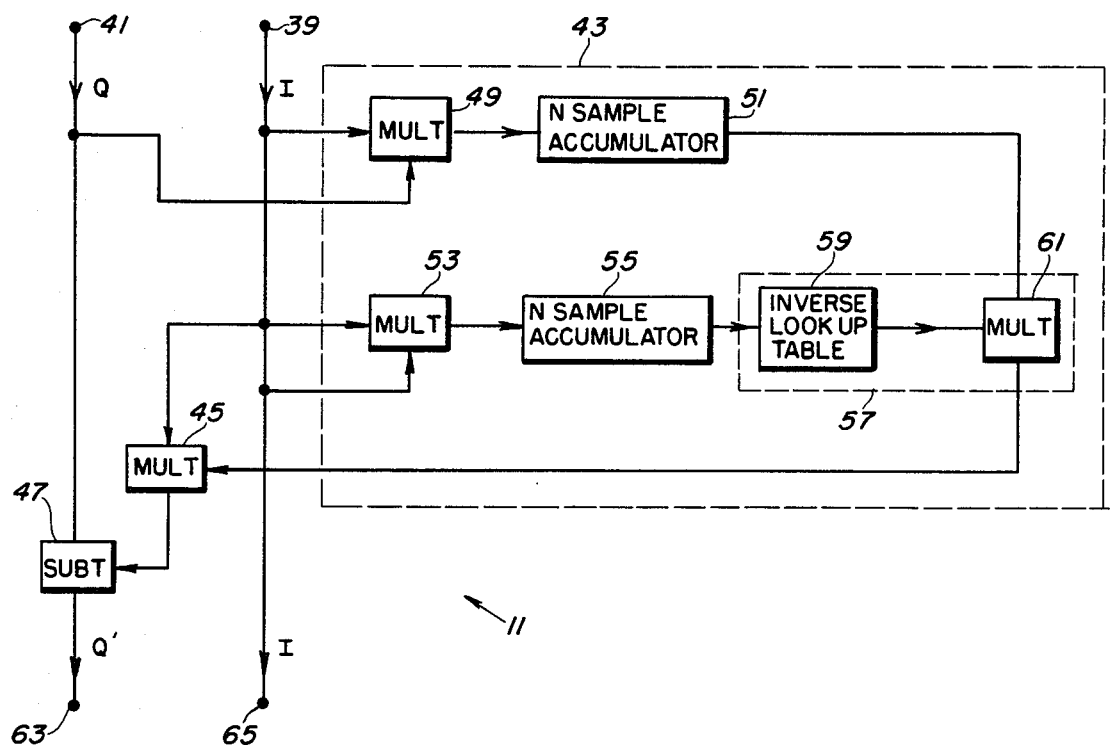
FIG. 2 is a block diagram of the orthogonalizer.

FIG. 2 shows the details of the orthogonalizer 11 which is the subject of the invention. The orthogonalizer includes input means (for example a pair of terminals 39 and 41) which receives a series of complex digital numbers each having correlated real and imaginary parts; a weight-establishing means 43 connected to the input means which establishes a weight which is a measure of the correlation; a multiplier 45 connected to the input means and to the weight-establishing means; and a subtractor 47 connected to the input means and to the multiplier. While the weight establishing means 43 may take a variety of forms, conveniently it may take the form shown in FIG. 2 of a multiplier 49 connected to the input means; an accumulator 51 connected to the multiplier 49; a multiplier 53 connected to the input means, an accumulator 55 connected to the multiplier 53; and a dividing means 57 connected to the accumulators 51 and 55. The dividing means 57 may comprise, for example, a read-only memory 59 functioning as an inverse look-up table, and a multiplier 61 connected to the accumulator 51 and to the read-only memory.

In operation, the real parts I of the complex digital numbers are inputted to terminal 39 and the imaginary parts Q of the complex digital numbers are inputted to terminal 41. The multiplier 49 forms the product of the imaginary part and the real part of each received complex digital number and outputs a series of such products $Q \times I$. The accumulator 51 forms the sum of the N products most recently formed by the multiplier 49, where N is an integer greater than one. The multiplier 53 forms the product of the real part I of each received complex digital number with itself and outputs a series of such products $I \times I$. The accumulator 55 forms the sum of the N products most recently formed by the multiplier 53. The inverse look-up table 59 takes the reciprocal of the sum of the N products most recently formed by the multiplier 53, and the multiplier 61 forms the product of the outputs of the inverse look-up table and of the accumulator 51 to obtain an output $\overline{Q \times I}/\overline{I \times I}$, where the bars denote averaging over N samples. The quotient is a weight which is a measure of the correlation between the real part I and the imaginary part Q of the most recently received complex digital number. The multiplier 45 forms the product of the real part I of the most recently received complex digital number with the weight to obtain a weighted number $$\left( \frac{\overline{Q \times I}}{\overline{I \times I}} \right) I.$$

This weighted number is then subtracted in the subtractor 47 from the imaginary part of the most recently received complex digital number to obtain a corrected imaginary part $$Q' = Q - \left( \frac{\overline{Q \times I}}{\overline{I \times I}} \right) I$$

which is orthogonal (uncorrelated) with the associated real part I. The corrected imaginary part Q' is fed to one output terminal 63, while the real part I is fed to the other output terminal 65. The output of the orthogonalizer 11 is thus a complex digital number having uncorrelated real and imaginary parts.

To mathematically verify that Q' is indeed orthogonal with I, multiply Q' in the above expression by I and average to obtain $$\overline{Q' \times I} = \overline{Q \times I} - \left( \frac{\overline{Q \times I}}{\overline{I \times I}} \right) \overline{I \times I}$$

$$= 0.$$

There is zero correlation between Q' and I.

Although the invention has been illustrated in the form of an improvement to an MTI radar, it is to be understood that it is applicable to any system where there is a need to orthogonalize the digital inphase I and quadrature Q outputs from I,Q detectors followed by analog-to-digital converters. Thus, for example, the orthogonalizer is suitable for use with coherent sidelobe cancelers which are limited in the amount of interference they can cancel by the non-orthogonality of the I,Q data.

Obviously, many modifications and variations of the present invention are possible in light of the above teachings. For example, while the invention has been shown orthogonalizing Q from I, it will be apparent that the connections can be reversed (i.e., 39 with 41, 65 with 63) to orthogonalize I from Q. Furthermore, in place of the sliding-window weight shown in FIG. 2, a batch process weight can be used where the weight determined from N samples is used on each of the N samples. It is therefore to be understood that within the scope of the appended claims, the invention may be practiced otherwise than as described.

What is claimed as new and desired to be secured by Letters Patent of the United States is:

1. An orthogonalizer comprising:
   input means for receiving a series of complex digital numbers, each number having correlated real and imaginary parts;
   weight-establishing means connected to the input means for establishing a weight which is a measure of the correlation;
   a first multiplier connected to the input means and to the weight-establishing means for forming the product of one of the parts of one of the received complex digital numbers with the weight; and
   a subtractor connected to the input means and to the multiplier for subtracting the product from the other part of the one received complex digital number to decorrelate the real and imaginary parts of the complex digital number.

2. The orthogonalizer recited in claim 1 wherein the weight-establishing means includes:
   a second multiplier connected to the input means for forming the product of the imaginary part and the real part of each received complex digital number and outputting a series of such products;
   a first accumulator connected to the second multiplier for forming the sum of the N products most recently formed by the second multiplier, where N is an integer greater than one;
   a third multiplier connected to the input means for forming the product of one of the parts of each received complex digital number with itself and outputting a series of such products;
   a second accumulator connected to the third multiplier for forming the sum of the N products most recently formed by the third multiplier; and
   dividing means connected to the first and second accumulators for dividing their outputs to generate the weight.

3. The orthogonalizer recited in claim 2 wherein the dividing means includes:
   a read-only memory functioning as an inverse look-up table for taking the reciprocal of the sum of the N products most recently formed by the third multiplier; and
   a fourth multiplier connected to the first accumulator and to the read-only memory for forming the product of their outputs.

4. A method of orthogonalization for correcting phase imbalances between inphase and quadrature channels of a digital radar signal processing system, said method comprising the steps of:
   transmitting a radar signal into space to illuminate a target;
   receiving radar echo signals reflected from said target;
   sampling said received radar echo signals and converting the resultant sampled echo signals into a series of complex digital numbers, each number having correlated real and imaginary parts;
   establishing a weight which is a measure of the corelation;
   forming the product of one of the parts of one of the complex numbers with the weight;
   subtracting the product from the other part of the one digital number to decorrelate the real and imaginary parts of the complex digital number; and
   processing the decorrelated real and imaginary parts to provide a signal for utilization.

5. The method recited in claim 4 wherein the weight establishing step includes:
   forming products of the imaginary part and the real part of each complex digital number;
   forming the sum of the N most recently formed products of the real and imaginary parts, where N is an integer greater than one;
   forming products of one of the parts of each complex digital number with itself;
   forming the sum of the N most recently formed products of the part with itself, and
   dividing the two sums to generate the weight.

6. The method recited in claim 5 wherein the dividing step includes:
   taking the reciprocal of the sum of the N most recently formed products of the part with itself; and
   forming the product of the reciprocal with the sum of the N most recently formed products of the real and imaginary parts.

* * * * *